(12) United States Patent
Foss

(10) Patent No.: US 8,595,972 B2
(45) Date of Patent: Dec. 3, 2013

(54) ENHANCED LASER FISHING ROD

(76) Inventor: Daniel V. Foss, Apple Valley, MN (US)

( * ) Notice: Subject to any disclaimer, the term of this patent is extended or adjusted under 35 U.S.C. 154(b) by 0 days.

(21) Appl. No.: 13/347,977

(22) Filed: Jan. 11, 2012

(65) Prior Publication Data

US 2012/0174466 A1 Jul. 12, 2012

Related U.S. Application Data

(63) Continuation of application No. 12/079,710, filed on Mar. 28, 2008, now abandoned.

(51) Int. Cl.
*A01K 97/12* (2006.01)
*A01K 87/00* (2006.01)

(52) U.S. Cl.
USPC .......................... 43/17; 43/17.5; 43/18.1 R

(58) Field of Classification Search
USPC ........................... 43/17, 17.5, 18.1 R
See application file for complete search history.

(56) References Cited

U.S. PATENT DOCUMENTS

| | | | | |
|---|---|---|---|---|
| 2,791,676 A * | 5/1957 | Cote | ................... | 43/17.5 |
| 3,017,499 A * | 1/1962 | Fore | ................... | 43/17.5 |
| 3,238,659 A * | 3/1966 | Lamb, Jr. | ................... | 43/17 |
| 3,862,509 A * | 1/1975 | Petersen, Jr. | ................... | 43/17.5 |
| 4,026,059 A * | 5/1977 | Ochs | ................... | 43/17.5 |
| 4,085,437 A * | 4/1978 | Hrdlicka et al. | ................... | 43/17.5 |
| 4,501,084 A * | 2/1985 | Mori | ................... | 43/17.5 |
| 4,617,751 A * | 10/1986 | Johansson | ................... | 43/17.5 |
| 4,775,920 A * | 10/1988 | Seibert et al. | ................... | 43/17.5 |
| 5,083,247 A * | 1/1992 | Robinson et al. | ................... | 43/17.5 |
| 5,172,508 A * | 12/1992 | Schmidt et al. | ................... | 43/17.5 |
| 5,182,873 A * | 2/1993 | Aragon, Jr. | ................... | 43/17 |
| 5,205,061 A * | 4/1993 | Echols, Jr. | ................... | 43/17.5 |
| 5,259,252 A * | 11/1993 | Kruse et al. | ................... | 43/17 |
| 5,276,990 A * | 1/1994 | Ramirez | ................... | 43/17.5 |
| 5,347,741 A * | 9/1994 | Konrad | ................... | 43/17.5 |
| 5,357,410 A * | 10/1994 | Cota et al. | ................... | 43/17.5 |
| 5,555,667 A * | 9/1996 | Bae et al. | ................... | 43/17 |
| 5,566,493 A * | 10/1996 | Minorics | ................... | 43/17.5 |
| 5,586,403 A * | 12/1996 | Ward | ................... | 43/17.5 |
| 5,644,864 A * | 7/1997 | Kelly | ................... | 43/17.5 |
| 5,738,433 A * | 4/1998 | Sparks | ................... | 43/17.5 |
| 5,797,211 A * | 8/1998 | Bae et al. | ................... | 43/17 |
| 5,826,366 A * | 10/1998 | Matibe | ................... | 43/17.5 |
| 5,943,809 A * | 8/1999 | Ring | ................... | 43/17.5 |
| 5,987,802 A * | 11/1999 | Caprio | ................... | 43/17.5 |
| 6,000,808 A * | 12/1999 | Hansen | ................... | 43/17.5 |
| 6,061,946 A * | 5/2000 | Toelken | ................... | 43/17 |
| 6,122,853 A * | 9/2000 | Genous-Moore | ................... | 43/17.5 |
| 6,149,286 A * | 11/2000 | Wiggins | ................... | 43/17.5 |
| 6,446,380 B1 * | 9/2002 | Radosavljevic et al. | ................... | 43/17 |
| 6,546,665 B1 * | 4/2003 | Eldredge et al. | ................... | 43/17.5 |
| 6,694,665 B1 * | 2/2004 | Moran | ................... | 43/17.5 |
| 6,789,348 B1 * | 9/2004 | Kneller et al. | ................... | 43/17.5 |
| 7,003,912 B1 * | 2/2006 | Morgan et al. | ................... | 43/17 |
| 7,051,470 B2 * | 5/2006 | Lybarger et al. | ................... | 43/17.5 |

(Continued)

*Primary Examiner* — Darren W Ark
(74) *Attorney, Agent, or Firm* — Mark A. Litman & Associates, P.A.

(57) ABSTRACT

A fishing rod enables viewing of pole bending activity in daylight and at nighttime. The rod has a light-transmitting pole for supporting a fishing line and having a handle end and a tip end. A collimated beam producing unit is located towards the handle end aligned to transmit a collimated beam into the interior of the pole in a direction towards the tip end. A reflector at the tip end reflects light back towards the handle end after exiting the tip end.

18 Claims, 3 Drawing Sheets

(56) References Cited

U.S. PATENT DOCUMENTS

| | | | |
|---|---|---|---|
| 7,562,488 B1* | 7/2009 | Perkins et al. | 43/17 |
| 7,614,177 B1* | 11/2009 | Wheeler | 43/17.5 |
| 7,824,054 B2* | 11/2010 | Rigsbee et al. | 43/17.5 |
| 8,104,220 B2* | 1/2012 | Cobb | 43/17 |
| 2003/0131520 A1* | 7/2003 | Bagshaw | 43/17 |
| 2004/0055204 A1* | 3/2004 | Allie | 43/18.1 R |
| 2004/0098899 A1* | 5/2004 | Yeh Yang | 43/18.1 R |
| 2004/0159039 A1* | 8/2004 | Yates et al. | 43/17.5 |
| 2006/0288629 A1* | 12/2006 | Parker et al. | 43/17.5 |
| 2007/0199230 A1* | 8/2007 | Pekin | 43/18.1 R |
| 2008/0178514 A1* | 7/2008 | Pekin | 43/17 |
| 2008/0250691 A1* | 10/2008 | Barnes et al. | 43/17 |
| 2010/0281753 A1* | 11/2010 | Gonzagowski | 43/17 |
| 2011/0162253 A1* | 7/2011 | Cobb | 43/17.5 |
| 2012/0227307 A1* | 9/2012 | Cuevas et al. | 43/17.5 |

\* cited by examiner

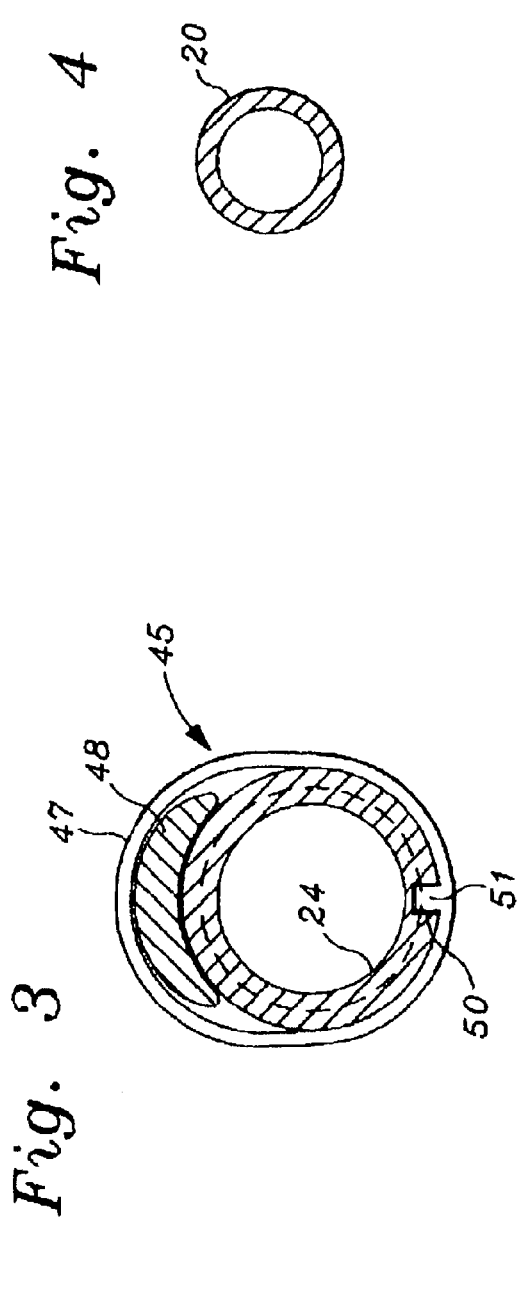
Fig. 4
Fig. 3
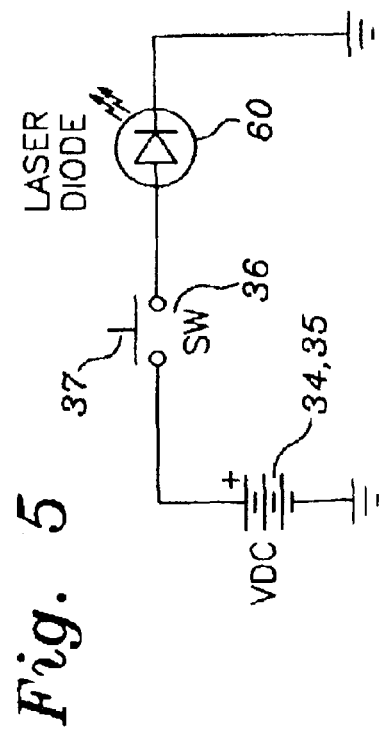
Fig. 5

ENHANCED LASER FISHING ROD

RELATED APPLICATION DATA

This application is a continuation-in-part of U.S. patent application Ser. No. 12/079,710, filed 28 Mar. 2008, titled "ENHANCED LASER FISHING ROD."

BACKGROUND OF THE INVENTION

1. Field of the Invention

This invention relates to fishing rods and, in particular, to lighted fishing rods for fishing either in daylight or in the dark.

2. Background of the Art

It is known that many species of fish are more active at dawn or dusk or at night or other times when lighting conditions are poor. Thus, fishing is frequently better during these periods and many people prefer to fish at these times. Because of the darkness, however, it is more difficult to see the end of the rod. This makes it harder, if not impossible, to observe the movement of the end of the rod when a fish is attempting to take the bait.

Various forms of lighted or illuminated fishing rods have been heretofore proposed for solving this problem. U.S. Pat. No. 5,172,508 (Schmidt et al.) describes the use of a removable flashlight unit in the handle of a fishing rod for illuminating the ends of fiber optic cables running up the hollow interior of the fishing pole.

U.S. Pat. No. 5,357,410 (Cota et al.) describes a light bulb located in an outer section of a fishing pole and connected to a mercury switch located at the tip of the pole for detecting jerking movement of the end of the pole. When the mercury switch detects movement, the light bulb is turned on to light up the outer section of the pole.

U.S. Pat. No. 5,738,433 (Sparks) describes a light bulb in the handle of a fishing pole for illuminating optical fibers extending up the hollow interior of the pole. The light bulb is connected in circuit with a sensor switch located at the tip end of the pole so that the light bulb is turned on when a fish strikes at the bait.

U.S. Pat. No. 6,149,286 describes a fishing rod having a hollow pole for supporting a fishing line, the pole having a handle end and a tip end. A hollow handle is affixed to the handle end of the pole. A laser beam producing unit is located within the handle structure and aligned to transmit a laser beam into the hollow interior of the pole in the direction of the tip end of the pole.

SUMMARY OF THE INVENTION

The present technology provides a fishing pole with collimated light that is internally transported or reflected from a handle end to a flexible pole end and is constructed to have not only night visibility of a strike, but has enhanced functionality to provide daylight indication of a strike. The collimated light transmitted through thru the flexible pole strikes a reflector at the thin tip of the pole, and bending of the pole causes light to either miss or better focus on the reflector to provide or remove a reflected indication of pole bending, which in turn is indicative of a strike. The reflector is positioned to reflect light back to the fisher when the pole is straight or to better reflect light back to the fisher when the pole is deflected a predetermined amount.

Other lighted or illuminated fishing rods are shown in U.S. Pat. Nos. 7,347,607; 7,051,470; 6,715,904; and 6,578,312. These references are incorporated by reference herein in their entirety.

BRIEF DESCRIPTION OF THE FIGURES

FIG. 3 is an enlarged cross-sectional view taken along section line 3-3 of FIG. 1.

FIG. 4 is an enlarged cross-sectional view taken section line 4-4 of FIGS. 1; and FIG. 5 is a schematic electrical circuit diagram showing the electrical connections for the various components of the laser fishing rod of FIG. 1.

DETAILED DESCRIPTION OF THE INVENTION

Figure 1:
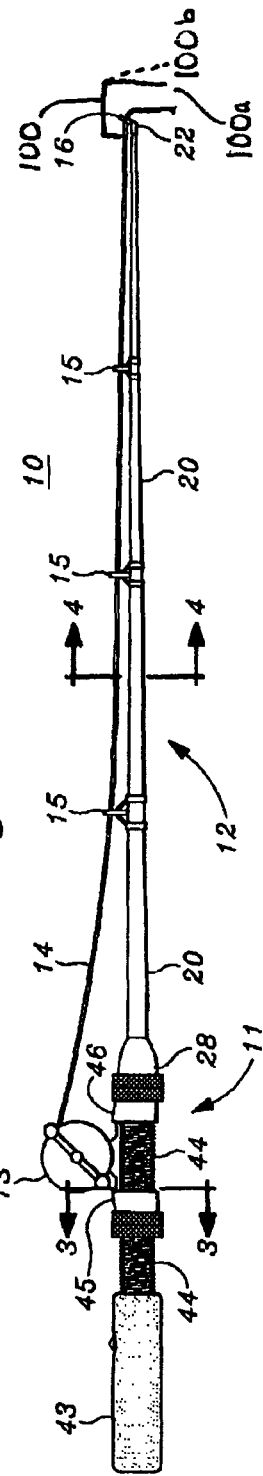
FIG. 1 is a side elevational view of a representative embodiment of a laser fishing rod constructed in accordance with the present invention.

The present technology provides a fishing pole with collimated light that is internally transported or reflected from a handle end to a flexible pole end and is constructed to have not only night visibility of a strike, but has enhanced functionality to provide daylight indication of s strike. Collimated light is often referred to as laser light, but in fact may be produced by technology other than lasers or may even be produced by refined focusing of light.

The collimated light transmitted through thru the flexible pole strikes a reflector at the thin tip of the pole (the tip from which the fishing line extends towards the water. Bending of the pole causes light to either miss or better focus on the reflector to provide or remove a reflected indication of pole bending, which in turn is indicative of a strike. The reflector is positioned to reflect light back to the fisher when the pole is straight or to better reflect light back to the fisher when the pole is deflected a predetermined amount.

The light according to prior art constructions is taught to be transmitted through a hollow pole with reflective surfaces on the walls of the hollow cannula or cavity within the pole. In the practice of the present technology, the pole may have total internal reflection wherein the pole also may be solid, with the central channel being transparent or highly translucent with sufficient reflectivity about the central channel to transmit the light without disruption of the linearity of the collimated light or excessive loss or absorbance of the light intensity during transmission through the channel.

The present technology provides a fishing rod having sufficient functionality to enable both daylight and night time indication of a strike on the line to assist the fisher. In particular, a fishing rod constructed in accordance with the present invention comprises a hollow pole for supporting a fishing line, such pole having a handle end and a tip end. A hollow handle structure is affixed to the handle end of the pole and is adapted for manual gripping by a fisherman. A laser beam producing unit is located within the handle structure and aligned to transmit a laser beam into the hollow interior of the pole in the direction of the tip end of the pole.

The laser beam causes the pole to glow in a brilliant and highly noticeable manner and is very sensitive to movement or flexing of the pole. Even a slight flexing of the pole causes a shimmering effect in the illumination and provides a visible indication when a fish attempts to take the bait. Also, the laser beam producing unit consumes very little electrical energy and can remain in continuous operation for several days on one set of batteries.

For a better understanding of the present technology, together with other and further advantages and features thereof, reference is made to the following description taken in connection with the accompanying drawings, the scope of the invention being pointed out in the appended claims.

Referring to FIG. 1, there is shown a fishing rod 10 having a handle portion 11, a pole portion 12 and a fishing line reel 13 mounted on the handle portion 11. A fishing line 14 extends from the reel 13 and through a series of line guide eyelets 15 and a final eyelet 16 located at the tip end of the pole. A reflector 100 is shown positioned at the tip end of the pole, and the reflector 100 may be fixed in a position to reflect light in a desired angle with respect to the axis of the pole portion 12. A fish hook (not shown) is attached to the free end of line 14 dangling from the tip end of the pole. The reflector 100 may include or be a final guiding hole for the fishing line. The reflector or final guiding hole component 100 must be constructed so that the light within the pole (whether a hollow pole or solid pole carrying the light) allows the light to exit the pole. To that end, the reflector or last guide hole component 100 must allow the light to exit the tip of the pole by the component 100 not blocking emission of the light. As the pole (whether hollow or solid) would ordinarily allow the light to exit the tip of the pole if it were not blocked by the reflector component 100 base or the last line guide hole component 100 at the tip, simply having a hole in the component 100 at the tip, or spacing the end of the component distally from the hole would allow the light to be emitted.

Figure 2:
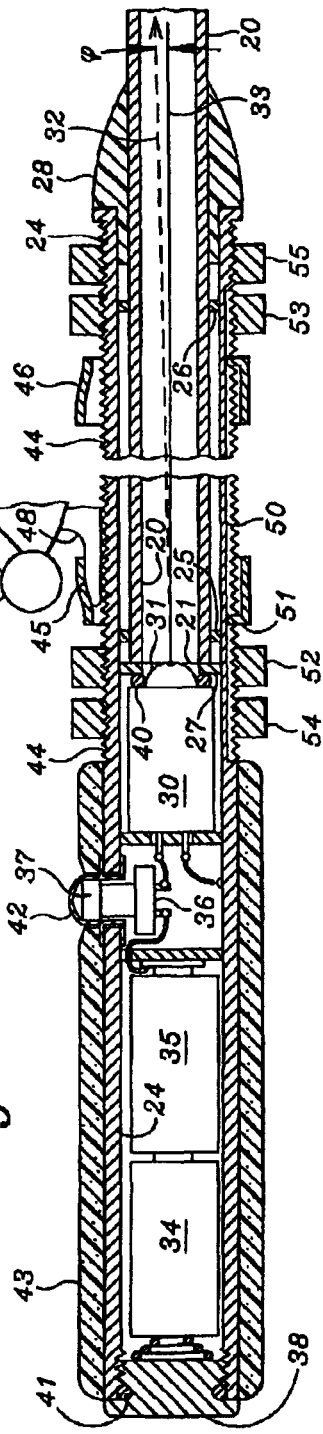
FIG. 2 is an enlarged elevational cross-section of the handle portion of the laser fishing rod of FIG. 1.

The pole portion 12 includes a flexible hollow pole 20 (or as previously described a solid pole with total internal reflection) for supporting the fishing line 14, such pole 20 having an open handle end 21 lodged inside the handle portion 11, as shown in FIG. 2, and a closed tip end 22 located at the opposite end of pole 20. The cross-sectional view of FIG. 4 clearly shows the hollow nature of the pole 20. Pole 20 is made of a translucent or transparent plastic material, such as a translucent or transparent fiberglass material, or solid flexible polymer.

The fishing rod 10 may also include a hollow handle structure 11 affixed to the handle end 21 of the pole 20. Such handle structure 11 is adapted for manual gripping by a fisherman and includes a hollow cylindrical structural handle (e.g., metal, composite, polymer or the like) member 24 which runs the length of the handle structure 11 and provides the main housing of the handle structure 11. This handle member 24 preferably may be made of hardened aluminum material.

Figure 1A:
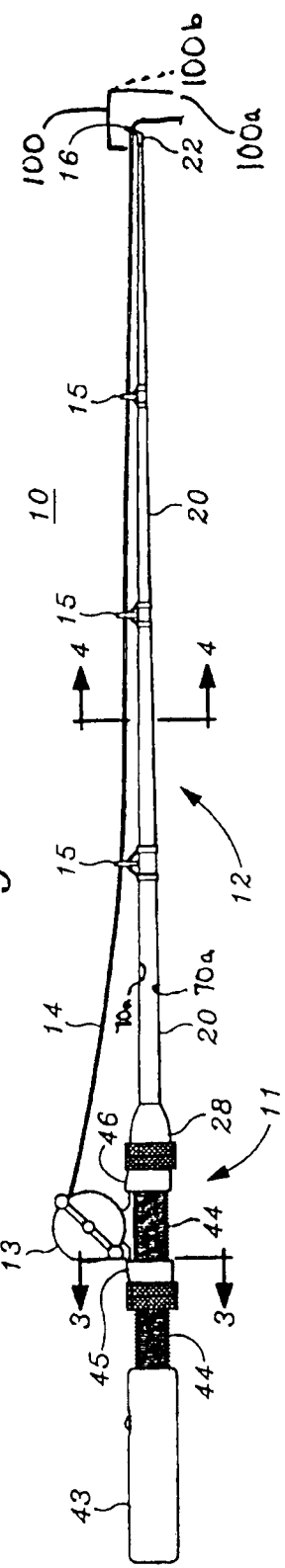
FIG. 1A is a side elevational view of a representative embodiment of a laser fishing rod constructed in accordance with the present invention.

In FIGS. 1A and 4, optional configurations are shown. In FIG. 4, the pole 20 is hollow, while in FIG. 1A, the pole is solid with internal reflecting surfaces 70a shown.

As shown in FIG. 2, the handle end of pole 20 is inserted a substantial distance into the open forward end of the handle member 24 and is secured therein by annular support rings 25 and 26 which are glued to the inner wall of handle member 24. The open end 21 of pole 20 rests on an annular shoulder 27 which is formed in or secured to the inner wall of handle member 24. An annular nosepiece 28 of resilient material such as rubber fits around the exterior of the pole 20 and has a reduced diameter portion which extends into the interior of the handle member 20. Nosepiece 28 keeps the pole 20 from being damaged be the end of the handle member 24 as the pole 20 flexes back and forth. The fishing rod 10 further includes a laser beam producing unit 30 located within the handle member 24 with the beam-emitting end 31 of the laser unit 30 positioned adjacent the open end 21 of the pole 20. The laser unit 30 is aligned to transmit a laser beam 32 into the hollow interior of the pole 20 substantially in line with the longitudinal center axis 33 of pole 20. For maximum effectiveness, the angle (phi) between the laser beam 32 and the pole center axis 33 should not exceed 0.5 or 1.0 degrees, depending in part on the length of the pole. A very slight angle of less than 0.5 degrees yet greater than 0 degrees is desirable in order to promote some reflection of the beam off of the inner surface of pole 20. The frailties of manufacture will usually insure that phi is not precisely zero degrees.

The laser beam producing unit 30 includes a laser diode located inside the unit for producing the laser beam 32. This beam is a narrow beam of monochromatic radiant energy. A suitable laser beam producing unit is a small compact cylindrical unit which is ideally suited for use in a fishing rod handle. The laser produces a beam of monochromatic visible (e.g., red) light having a nominal wavelength of between 410 and 780 nm nanometers (e.g., 650 nanometers) and requires an operating voltage of only at least 1.5 volts DC, such as 3.0 volts DC. Also, its rate of power consumption should be very small and two AA batteries should be sufficient for continuous operation of the unit for several days.

The fishing rod 10 also includes an electric battery source located within the rearward end of the handle member 24 for supplying electrical operating energy to the laser beam producing unit 30. In the present embodiment, this electric battery source which may take the form of a pair of AA size dry cell batteries 34 and 35 which are operated in series to produce a total direct-current voltage of approximately 3.0 volts.

The fishing rod 10 further includes a switch mechanism 36 located within the handle member 24 for turning on and off the flow of electrical energy from the battery source 34, 35 to the laser beam producing unit 30. This switch mechanism 36 includes a switch setting member 37 located in a lateral passageway through the side of the handle member 24 and exposed for actuation by a person using the fishing rod 10. Switch mechanism 36 may take the form of a micro switch and the switch-setting member 37 may take the form of a push-button member. A removable metal end cap 38 is threaded into the rear end of the handle member 24 for closing this end of handle member 24.

The fishing rod 10 also includes moisture-resistant sealing members for preventing entry of moisture into the interior portion of the handle member 24 in which are located the electrical components, namely, the laser beam producing unit 30, the batteries 34 and 35 and the switch mechanism 36. These sealing members include an O-ring seal 40 located between the beam-emitting nipple 31 and shoulder 27, another O-ring seal 41 located between end cap 38 and handle member 24, and a resilient waterproof membrane 42 covering the switch push-button member 37 and the opening of the lateral passageway in the wall of handle member 24. This membrane 42 has a first annular flap which tucks inside the handle member 24 and a second annular flap which is squeezed between the outside of handle member 24 and a resilient tubular handle cover 43 which slides over the rearward portion of the handle member 24. The handle cover 43 may be made of neoprene or foam rubber or the like.

The fishing rod 10 further includes a unique balance adjustment mechanism for balancing the weight of the fishing rod to improve the feel of the rod in the hand of the fisherman. This balance adjustment mechanism includes structure for enabling adjustment of the longitudinal position of the fishing line reel 13 on the handle member 24. This structure includes circumferential threads 44 which are formed on the exterior of a forward section of the handle member 24. A pair of reel mounting loops 45 and 46 are slideably mounted on the threaded section 44 of the handle member 24 for securing the reel 13 to the handle member 24. A raised collar portion of each mounting loop slides over a foot portion on the base of the reel structure to hold the reel 13 in place. As shown in FIG. 3 for rearward mounting loop 45, a raised collar portion 47 slides over a foot portion 48 of the reel base. A longitudinally-extending slot 50 in the underside of handle member 24 is provided for receiving an inwardly-extending key tab 51 on mounting loop 45. This prevents rotation of the mounting loop 45 around the handle member 24. The forward mounting loop 46 is constructed in this same manner, but is mounted in a reverse manner so that the larger opening of the raised collar portion faces in a rearward direction for receiving the front foot of the reel base.

A pair of internally-threaded retaining rings 52 and 53 are threaded onto the threaded portion 44 of handle member 24, with the ring 53 positioned in front of the forward reel mounting loop 46 and the other ring 52 positioned in back of the rearward reel mounting loop 45. With the fishing line reel 13 in place, retaining rings 52 and 53 are advanced in opposite directions toward their respective mounting loops 45 and 46 so as to push the mounting loops onto the support feet of the reel base and to retain the mounting loops snugly in place on such support feet. Adjustment of the longitudinal position of the reel 13 is accomplished by loosening the appropriate retaining ring, shifting the reel toward the loosened ring and then advancing the other retaining ring to lock the reel in the new position. The longitudinal position of reel 13 is adjusted until the fishing rod 10 has the balance desired by the fisherman.

A pair of internally-threaded locking rings 54 and 55 are threaded onto the handle member 24 for jamming against retaining rings 52 and 53, respectively, for making sure the retaining rings 52 and 53 don't come loose alter they are tightened in place against the reel support base.

FIG. 5 shows a schematic wiring diagram for the electrical components inside the handle member 24. As shown in FIG. 5, batteries 34 and 35, switch mechanism 36 and laser diode 60 (located inside laser unit 30) are connected in a series circuit relationship. Thus, switch 36, which is a two-position switch controls the flow of current from batteries 34 and 35 to the laser diode 60. In a closed switch position, current flows through the laser diode 60 and a laser beam is produced. Conversely, in an open switch position, no current flows and no laser beam is produced.

The laser beam 32 causes the pole 20 to glow in a brilliant and highly noticeable manner. For the case of a laser which emits laser light having a wavelength of 650 nanometers, the pole 20 glows with a bright red color which is clearly visible for a considerable distance at night. The laser illuminated pole is also very sensitive to movement or flexing of the pole. Even a slight flexing of the pole causes a shimmering or rippling effect in the illumination. This provides a very visible indication that a fish is attempting to take the bait. The addition of the reflector 100 enhances the operation of the present technology in a number of ways. If the reflector 100 is positioned (as in position 100*a*) relatively perpendicular to the light exiting the pole 20, a fisherman can see the light reflected backwards in both daylight and night while fishing. Movement or flexing of the pole would then prevent reflection of the light back to the fisher. The intensity of the reflected light is easier to see than the light within the pole itself. If the reflector 100 is positioned (as in position 100*b*) relatively non-perpendicular to the light exiting the pole 20, a fisherman can see the light reflected backwards in both daylight and night while fishing only when the pole is deflected enough to become reflected back to the fisherman, while when the pole is straight it is not reflected backwards.

The reflector may be shiny metal, shiny metal covered structure, a mirror-like surface or the like. The reflecting surface may be flat or concave or convex so as to direct the reflected light in a designed manner.

A further advantage is the very low rate of electrical power consumption by the laser beam producing unit 30. This means that the pole 20 can remain illuminated for very long periods of time, even several days, without fear of wearing out the batteries. Thus, the pole can be left on for the entire fishing session. This makes it easier to locate the pole when it is not being used or when it is accidentally dropped into the water at night.

While there has been described what is at present considered to be a preferred embodiment of this invention, it will be obvious to those skilled in the art that various changes and modifications may be made therein without departing from the invention and it is, therefore, intended to cover all such changes and modifications as come within the true spirit and scope of the invention. For example, the reflector may be provided as a removable or detachable component that can be added to existing poles, especially lighted poles. After removal of the reflector, the collimated light could be directed at an object, such as an object on the wall of an ice fishing shed, and movement of the light can be observed, usually in a darkened environment and not intense sunlight.

What is claimed:

1. A fishing rod comprising:
   a light-transmitting pole of transparent or translucent polymer for supporting a fishing line and having a handle end and a tip end;
   a collimated beam producing unit located towards the handle end aligned to transmit a collimated beam into an interior portion of the light-transmitting pole of transparent or translucent polymer in a direction towards the tip end, the collimated beam causing the pole to glow along its length; and
   a reflector beyond the tip end which reflects light back towards the handle end after exiting the tip end of the light-transmitting pole of transparent or translucent polymer, such that bending of the pole causes reflected light to either miss or better focus on the reflector to provide or remove a reflection indication of pole bending.

2. The fishing rod of claim 1 wherein the reflector reflects light back towards the handle end after exiting the tip end when the pole is straight.

3. The fishing rod of claim 1 wherein the reflector does not reflect light back towards the handle end after exiting the tip end when the pole is straight, but does reflect light back towards the handle end when the pole is flexed.

4. The fishing rod of claim 1 wherein the pole is hollow.

5. A fishing rod in accordance with claim 4 wherein the hollow pole is made of a translucent material.

6. A fishing rod in accordance with claim 4 wherein the hollow pole is made of a transparent material.

7. A fishing rod in accordance with claim 4 wherein the hollow pole is made of a plastic material.

8. A fishing rod in accordance with claim 4 wherein the hollow pole is made of a fiberglass material.

9. The fishing rod of claim 1 wherein the pole is solid and has an internal reflecting surface.

10. A fishing rod in accordance with claim 1 wherein the handle end comprises aluminum.

11. A fishing rod in accordance with claim 1 wherein the collimated beam is transmitted into the interior portion of the pole substantially in line with a longitudinal center axis of the pole.

12. fishing rod in accordance with claim 1 wherein the collimated beam producing unit is a laser beam producing unit including a laser diode for producing the laser beam.

13. A fishing rod in accordance with claim 12 wherein the laser beam is a beam of monochromatic visible light energy between 620 and 750 nanometers.

14. A fishing rod comprising: a hollow cylindrical metal handle member; a flexible hollow pole of translucent fiberglass material for supporting a fishing line and having an open handle end and a closed tip end, the open handle end being inserted a substantial distance into a forward end of the metal handle member and secured therein; a laser beam producing unit located within the metal handle member with a beam-emitting end thereof adjacent the open handle end of the pole and aligned to transmit a laser beam into a hollow interior of the pole substantially in line with a longitudinal center axis of the pole; an electric battery source located within a rearward end of the metal handle member for supplying electrical operating energy to the laser beam producing unit; a switch mechanism located in the metal handle member for turning on and off flow of electrical energy from the battery source to the laser beam producing unit and having a switch setting member located in a lateral passageway through a side of the handle member and exposed for actuation by a fisherman; a removable end cap for closing the rearward end of the metal handle member; and a reflector beyond the tip end of the pole which reflects light back towards the handle end after exiting the tip end of the pole, such that bending of the pole causes reflected light to either miss or better focus on the reflector to provide or remove a reflection indication of pole bending.

15. The fishing rod of claim 14 wherein the reflector reflects light back towards the handle end after exiting the tip end when the pole is straight.

16. The fishing rod of claim 14 wherein the reflector does not reflect light back towards the handle end after exiting the tip end when the pole is straight, but does reflect light back towards the handle end when the pole is flexed.

17. The fishing rod of claim 14 wherein the pole is hollow.

18. A fishing rod comprising: a light-transmitting pole of transparent or translucent polymer for supporting a fishing line and having a handle end and a tip end; a collimated beam producing unit located adjacent the handle end and aligned to transmit a collimated beam into an interior portion of the light-transmitting pole of transparent or translucent polymer in a direction from the handle end towards the tip end, which collimated beam causes the pole to glow along its length; the tip end of the pole of transparent or translucent polymer allowing light from within the pole to exit the pole; and a reflector beyond the tip end which reflects light emitted out of the tip end of the pole back towards the handle after exiting the tip end of the light-transmitting pole of transparent or translucent polymer, such that bending of the pole causes reflected light to either miss or better focus on the reflector to provide or remove a reflection indication of pole bending.

* * * * *